United States Patent
Baldemair et al.

(10) Patent No.: US 10,972,213 B2
(45) Date of Patent: Apr. 6, 2021

(54) SIMULTANEOUS TRANSMISSION OF PERIODIC CQI AND ACK/NACK

(71) Applicant: Telefonaktiebolaget LM Ericsson (publ), Stockholm (SE)

(72) Inventors: Robert Baldemair, Solna (SE); Stefan Parkvall, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 16/336,810

(22) PCT Filed: Nov. 3, 2017

(86) PCT No.: PCT/SE2017/051092
§ 371 (c)(1),
(2) Date: Mar. 26, 2019

(87) PCT Pub. No.: WO2018/084791
PCT Pub. Date: May 11, 2018

(65) Prior Publication Data
US 2019/0280806 A1 Sep. 12, 2019

Related U.S. Application Data

(60) Provisional application No. 62/417,868, filed on Nov. 4, 2016.

(51) Int. Cl.
*H04W 72/08* (2009.01)
*H04L 1/00* (2006.01)
(Continued)

(52) U.S. Cl.
CPC ......... *H04L 1/0026* (2013.01); *H04B 7/0613* (2013.01); *H04L 1/1671* (2013.01);
(Continued)

(58) Field of Classification Search
CPC ... H04L 43/0876; H04L 69/40; H04L 43/106; H04L 43/087; H04L 69/22; H04L 69/16; H04W 72/08
See application file for complete search history.

(56) References Cited

U.S. PATENT DOCUMENTS 10,182,467 B2 * 1/2019 Park ............... H04L 5/0053
2009/0245284 A1 10/2009 Xu et al.
(Continued)

FOREIGN PATENT DOCUMENTS

EP 2214335 A1 4/2010
EP 2357735 A2 8/2011
(Continued)

OTHER PUBLICATIONS

Fraser, Sandy, "LTE Channel State Information (CSI)," Agilent in Wireless Communications, Agilent Technologies, Wireless Communications, May 13, 2012, URL: https://www.keysight.com/upload/cmc_upload/All/31May2012_LTE.pdf, retrieved Nov. 1, 2016, 66 pages.
(Continued)

*Primary Examiner* — Lan-Huong Truong
(74) *Attorney, Agent, or Firm* — Christopher & Weisberg, P.A.

(57) ABSTRACT

Methods and systems for simultaneous transmission of periodic Channel Quality Indicator (CQI) and Hybrid Automatic Repeat Request (HARQ) Acknowledgement (ACK)/Negative Acknowledgement (NACK) are presented. According to one aspect, a method of operation of a node comprises configuring the node to have two differently sized sets of resources. The method includes determining that the node needs to report feedback, the feedback comprising at least a periodic CQI feedback. The method includes, upon determining that the node needs to report the feedback, selecting one of the differently sized sets of resources to be
(Continued)

used for reporting the feedback, wherein the larger set is selected when the node needs to also report a HARQ feedback, and wherein the smaller set is selected when the node does not need to also report a HARQ feedback. The method includes reporting the feedback on the selected set of resources.

15 Claims, 7 Drawing Sheets

(51) Int. Cl.
  *H04B 7/06* (2006.01)
  *H04L 1/16* (2006.01)
  *H04L 1/18* (2006.01)
  *H04L 5/00* (2006.01)

(52) U.S. Cl.
  CPC .......... *H04L 1/1812* (2013.01); *H04L 1/1854* (2013.01); *H04L 1/1861* (2013.01); *H04L 5/0055* (2013.01); *H04L 5/0057* (2013.01)

(56) References Cited

U.S. PATENT DOCUMENTS

| | | | |
|---|---|---|---|
| 2010/0113057 A1* | 5/2010 | Englund | H04L 1/0028 |
| | | | 455/452.1 |
| 2010/0309857 A1 | 12/2010 | Kawamura et al. | |
| 2011/0205981 A1 | 8/2011 | Koo et al. | |
| 2012/0082157 A1 | 4/2012 | Yamada et al. | |
| 2014/0219202 A1 | 8/2014 | Kim et al. | |
| 2014/0362792 A1 | 12/2014 | Cheng et al. | |
| 2015/0358111 A1* | 12/2015 | Marinier | H04L 27/0008 |
| | | | 370/329 |
| 2016/0183244 A1* | 6/2016 | Papasakellariou | H04L 5/0057 |
| | | | 370/329 |

FOREIGN PATENT DOCUMENTS

| | | |
|---|---|---|
| EP | 2760171 A2 | 7/2014 |
| WO | 2010148319 A1 | 12/2010 |
| WO | 2016123372 A1 | 8/2016 |
| WO | 2016162803 A1 | 10/2016 |
| WO | 2017050062 A1 | 3/2017 |
| WO | 2018084790 A1 | 5/2018 |

OTHER PUBLICATIONS

LG Electronics, "R1-1613036: Discussion on 2-HARQ process for eNB-IoT," Third Generation Partnership Project (3GPP), TSG RAN WG1 Meeting #87, Nov. 14-18, 2016, 3 pages, Reno, USA.

International Search Report and Written Opinion for International Patent Application No. PCT/SE2017/051091, dated Mar. 19, 2018, 15 pages.

International Search Report and Written Opinion for International Patent Application No. PCT/SE2017/051092, dated Feb. 1, 2018, 12 pages.

International Preliminary Report on Patentability for International Patent Application No. PCT/SE2017/051092, dated Oct. 12, 2018, 15 pages.

Examination Report for European Patent Application No. 17798008.3, dated Feb. 13, 2019, 5 pages.

Examination Report for European Patent Application No. 17798008.3, dated May 7, 2019, 5 pages.

Final Office Action for U.S. Appl. No. 16/336,788, dated Sep. 4, 2020, 9 pages.

Non-Final Office Action for U.S. Appl. No. 16/336,788, dated May 1, 2020, 8 pages.

Extended European Search Report for European Patent Application No. 17867995.7, dated May 27, 2020, 9 pages.

* cited by examiner

SIMULTANEOUS TRANSMISSION OF PERIODIC CQI AND ACK/NACK

RELATED APPLICATIONS

This application is a 35 U.S.C. § 371 national phase filing of International Application No. PCT/SE2017/051092, filed Nov. 3, 2017, which claims the benefit of provisional patent application Ser. No. 62/417,868, filed Nov. 4, 2016, the disclosures of which are hereby incorporated herein by reference in their entireties.

TECHNICAL FIELD

The present disclosure relates to physical layer control signaling of a wireless device operating within wireless communications networks, including transmission of Channel Quality Indicator (CQI) and Hybrid Automatic Repeat Requests (HARQs).

BACKGROUND

Channel Quality Indicator (CQI) feedback is needed to inform a transmitter about channel quality at the receiving end. In Long Term Evolution (LTE) two kinds of CQI feedback are distinguished: periodic CQI feedback (also referred to as "periodic CQI") and aperiodic CQI feedback (also referred to as "aperiodic CQI").

In aperiodic CQI the transmitting node explicitly requests a transmission of CQI feedback. The triggering may happen via a triggering bit in a Downlink Control Information (DCI) message. If the triggering is done in an uplink grant, e.g., for scheduled data, the scheduler, e.g., an Enhanced or Evolved Node B (eNB), a base station, and the like, can adjust the size of the scheduled resource to accommodate both the uplink data and the CQI feedback.

Periodic CQI is semi-statically configured and occurs at periodic instances. Together with the time pattern also a periodic resource is configured which should be used for the periodic CQI reporting.

LTE uses a Hybrid Automatic Repeat Request (HARQ) protocol where the receiver informs the transmitter about success (i.e., Acknowledgement (ACK)/no success (i.e., Negative Acknowledgement (NACK)) of the corresponding transmission. The resources for ACK/NACK transmission are typically signaled as a combination of dynamic signaling (in the DCI message) and semi-statically configured parameters.

LTE uses one HARQ ACK/NACK feedback bit per transport block. In case of spatial bundling, feedback of two Multiple Input Multiple Output (MIMO) transport blocks can be bundled (e.g., using a logical AND operation) into a single value. Furthermore, in case of Carrier Aggregation (CA) it is often the case that more downlink carriers are configured than uplink carriers and/or HARQ feedback transmission may even be limited to a single component carrier. Also in a Time Division Duplexing (TDD) protocol having more downlink than uplink slots, HARQ feedback of multiple downlink slots must be conveyed in fewer uplink slots. Depending on the configuration, a few bits (e.g., Frequency Division Duplexing (FDD) without carrier aggregation) or many bits (e.g., TDD with downlink-heavy carrier aggregation) must be conveyed per feedback occurrence. Also, operations in unlicensed bands can increase the number of HARQ feedback bits.

Aperiodic CQI is only transmitted if Physical Uplink Shared Channel (PUSCH) resources are scheduled. If aperiodic CQI should be transmitted together with ACK/NACK this is done on PUSCH since PUSCH resources are available anyway.

In conventional systems including LTE, different methods are applied for periodic CQI feedback together with HARQ, depending on the HARQ feedback size:

Physical Uplink Control Channel (PUCCH) Format 2a/2b: For one or two HARQ feedback bits, the CQI can either be dropped or transmitted together with the HARQ feedback on CQI resources. For larger ACK/NACK feedback sizes, the CQI is dropped since neither the ACK/NACK resources nor the CQI resources are sufficient to accommodate both feedback types and ACK/NACK feedback is transmitted on ACK/NACK resources.

PUCCH Format 3: If combined payload size of ACK/NACK, the Channel State Information (CSI), and Scheduling Request (SR) is less or equal to 22 bits, the combined payload is transmitted using PUCCH Format 3. If the combined payload exceeds 22 bits, spatially bundling is applied to the ACK/NACK bits. If the combined payload size of spatially bundled ACK/NACK, CSI, and SR is less or equal to 22 bits, spatially bundled ACK/NACK, CSI, and SR is transmitted using PUCCH Format 3. Otherwise CSI is dropped and ACK/NACK, together with SR, is transmitted using PUCCH Format 3.

PUCCH Format 4 and 5 use similar procedures as PUCCH Format 3.

As used herein, the term "combined resources," or alternatively, "combined transmission resources," refers to the collection of time/frequency resources used to transmit a set of signals or channels. A combination of resources need not be contiguous in time or frequency with each other. Where each of the separate signals or channels occupies its own distinct set of transmission resources, the term "combined resources" refers to the collection that includes all of the distinct sets. In some cases, multiple separate signals or channels may be mathematically or otherwise combined and transmitted using the resources usually used for only some of (or even just one of) the separate signals.

SUMMARY

Methods and systems for simultaneous transmission of periodic Channel Quality Indicator (CQI) and Hybrid Automatic Repeat Request (HARQ) Acknowledgement (ACK)/Negative Acknowledgement (NACK) are herein presented. Multiple differently sized resources are configured for periodic CQI. If only periodic CQI is reported, the smallest resource is selected. If periodic CQI needs to be transmitted together with ACK/NACK feedback, one of the configured resources matching the required payload is selected. By choosing resources of sufficient size to contain the required payload, CQI dropping is reduced or even avoided.

According to one aspect of the present disclosure, a method of operation of a node comprises configuring the node to have two differently sized sets of resources, and determining that the node needs to report feedback, the feedback comprising at least a periodic CQI feedback. The method includes, upon determining that the node needs to report the feedback, selecting one of the differently sized sets of resources to be used for reporting the feedback, wherein the larger set of resources is selected when the feedback also comprises a HARQ feedback, and wherein the smaller set of resources is selected when the feedback does not also comprise a HARQ feedback. The method includes reporting the feedback on the selected set of resources.

In some embodiments, the HARQ feedback comprises an ACK or NACK.

In some embodiments, the node is configured to have more than two differently sized sets of resources.

In some embodiments, one of the more than two sets of resources is selected according to the number of bits that comprise the feedback.

In some embodiments, one of the more than two sets of resources is selected according to the number of bits that comprise the HARQ feedback.

In some embodiments, the node receives an indication of which one of the sets of resources to use for reporting the feedback.

In some embodiments, the node receives the indication from a scheduler.

In some embodiments, the node receives the indication via Downlink Control Information (DCI) or Media Access Control (MAC) control signaling.

In some embodiments, the selection of the set of resources is based at least in part on the received indication.

In some embodiments, the selection of the set of resources is based at least in part on the number of bits that comprise the feedback.

According to another aspect of the present disclosure, a method of operation of a node comprises: configuring the node to have two differently sized sets of resources; determining that the node needs to report feedback, the feedback comprising a periodic CQI feedback and a HARQ feedback; upon determining that the node needs to report the feedback, selecting one of the differently sized sets of resources to be used for reporting the feedback, wherein the larger set of resources is selected when the total number of CQI feedback bits and HARQ feedback bits exceeds a first threshold, and wherein the smaller set of resources is selected when the total number of CQI feedback bits and HARQ feedback bits does not exceed the first threshold; and reporting the feedback on the selected set of resources.

In some embodiments, selecting one of the differently sized sets of resources to be used for reporting the feedback further comprises: determining that the total number of CQI and HARQ feedback bits exceeds a second threshold greater than the first threshold; and, upon a determination that the total number of CQI and HARQ feedback bits exceeds the second threshold, reporting less than all of the CQI feedback and HARQ feedback using one of the differently sized sets of resources.

In some embodiments, the node is configured to have more than two differently sized sets of resources.

In some embodiments, one of the more than two sets of resources is selected according to the number of bits that comprise the feedback.

In some embodiments, one of the more than two sets of resources is selected according to the number of bits that comprise the HARQ feedback.

In some embodiments, the node receives an indication of which one of the sets of resources to use for reporting the feedback.

In some embodiments, the node receives the indication from a scheduler.

In some embodiments, the node receives the indication via DCI or MAC control signaling.

In some embodiments, the selection of the set of resources is based at least in part on the received indication.

In some embodiments, the selection of the set of resources is based on the number of bits that comprise the feedback.

According to another aspect of the present disclosure, a node is adapted to operate according to the method of any of the previous embodiments.

According to another aspect of the present disclosure, a node comprises at least one processor and memory. The memory comprises instructions executable by the at least one processor whereby the node is operable to configure the node to have two differently sized sets of resources, and determine that the node needs to report feedback, the feedback comprising at least a periodic CQI feedback. Upon determining that the node needs to report the feedback, the node is operable to select one of the differently sized sets of resources to be used for reporting the feedback, wherein the larger set of resources is selected when the node needs to also report a HARQ feedback, and wherein the smaller set of resources is selected when the node does not need to also report a HARQ feedback. The node is further operable to report the feedback on the selected set of resources.

In some embodiments, the HARQ feedback comprises an ACK or NACK.

In some embodiments, the node is configured to have more than two differently sized sets of resources.

In some embodiments, one of the more than two differently sized sets of resources is selected according to the number of bits that comprise the feedback.

In some embodiments, one of the more than two differently sized sets of resources is selected according to the number of bits that comprise the HARQ feedback.

In some embodiments, the node receives an indication of which one of the sets of resources to use for reporting the feedback.

In some embodiments, the node receives the indication from a scheduler.

In some embodiments, the node receives the indication via DCI or MAC control signaling.

In some embodiments, the selection of the set of resources is based at least in part on the received indication.

In some embodiments, the selection of the set of resources is based at least in part on the number of bits that comprise the feedback.

According to another aspect of the present disclosure, a node comprises at least one processor and memory. The memory comprises instructions executable by the at least one processor, whereby the node is operable to configure the node to have two differently sized sets of resources. The node is further operable to determine that the node needs to report feedback, the feedback comprising a periodic CQI feedback and a HARQ feedback. Upon determining that the node needs to report the feedback, the node is further operable to select one of the differently sized sets of resources to be used for reporting the feedback, wherein the larger set is selected when the total number of CQI feedback bits and HARQ feedback bits exceeds a first threshold, and wherein the smaller set is selected when the total number of CQI feedback bits and HARQ feedback bits does not exceed the first threshold. The node is further operable to report the feedback on the selected set of resources.

In some embodiments, the node is further operable to: determine that the total number of CQI and HARQ feedback bits exceeds a second threshold greater than the first threshold; and, upon a determination that the total number of CQI and HARQ feedback bits exceeds the second threshold, report less than all of the CQI feedback and HARQ feedback using one of the differently sized sets of resources.

In some embodiments, the node is configured to have more than two differently sized sets of resources.

In some embodiments, one of the more than two sets of resources is selected according to the number of bits that comprise the feedback.

In some embodiments, one of the more than two sets of resources is selected according to the number of bits that comprise the HARQ feedback.

In some embodiments, the node receives an indication of which one of the sets of resources to use for reporting the feedback.

In some embodiments, the node receives the indication from a scheduler.

In some embodiments, the node receives the indication via DCI or MAC control signaling.

In some embodiments, the selection of the set of resources is based at least in part on the received indication.

In some embodiments, the selection of the set of resources is based at least in part on the number of bits that comprise the feedback.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
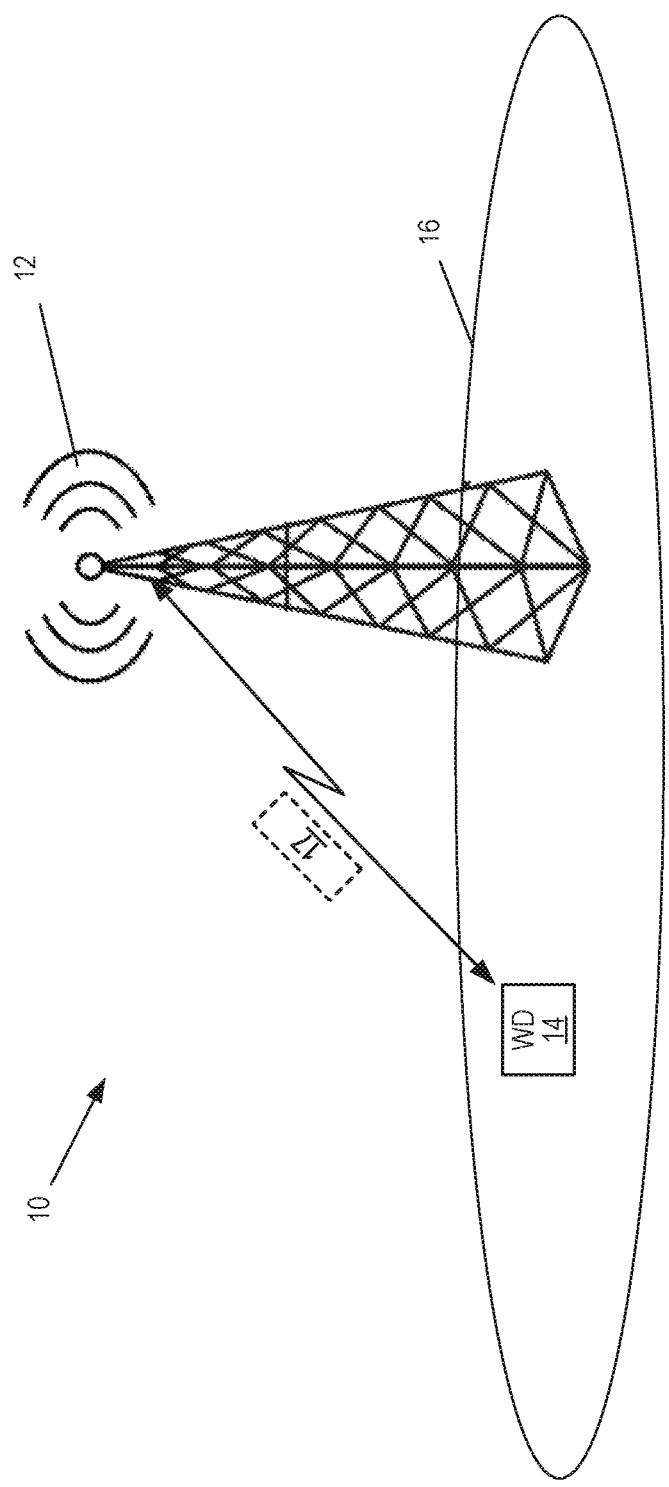
FIG. 1 illustrates a wireless communication system according to some embodiments of the present disclosure.

FIG. 1 illustrates a wireless communication system according to some embodiments of the present disclosure. In this regard, FIG. 1 illustrates one example of a wireless system 10 (e.g., a cellular communications system) in which embodiments of the present disclosure may be implemented. The wireless system 10 includes a first node 12, which in this example is a radio access node. However, the first node 12 is not limited to a radio access node and can be another device such as a general radio node allowing communication within a radio network, including a wireless device as described below. The radio access node 12 provides wireless access to other nodes such as wireless devices or other access nodes, such as a second node 14, within a coverage area 16 (e.g., cell) of the radio access node 12. In some embodiments, the second node 14 is a Long Term Evolution (LTE) User Equipment (UE). Note that the term "UE" is used herein in its broad sense to mean any wireless device. As such, the terms "wireless device" and "UE" are used interchangeably herein. In other embodiments, the second node 14 may be a Transmission and Reception Point (TRP) (e.g., base stations, access nodes, etc.), especially one that uses self-backhauling to wirelessly communicate to another node, or other network node allowing communication with a network.

For simultaneous feedback of periodic CQI and large HARQ feedback sizes, the CQI bits are dropped, which leads to outdated CQI information at the transmitter. Outdated CQI information leads to less efficient link adaptation and reduced throughput. Thus, it is desired to avoid dropping CQI bits if possible.

The subject matter described herein proposes to configure a terminal with several periodic CQI resources with different sizes. As used herein, the term "resources" refers to resources in the time domain or frequency domain. Examples of time domain resources include, but are not limited to, symbols (e.g., OFDM symbols), sub-frames, slots, other segments in the time domain, and portions or multiples thereof. Examples of frequency domain resources include, but are not limited to, sub-carriers, blocks of sub-carriers, frequency bandwidths, and portions or multiples thereof. A "time-frequency resource" is a set of resources that are defined in terms of time-domain and frequency domain. Examples of time-frequency resources include, but are not limited to, a resource element in a time-frequency grid, a resource block containing multiple resource elements, and portions or multiples thereof.

As used herein, a "set of resources" refers to a collection of one or more resources defined in terms of time domain, frequency domain, or time-frequency domain. The resources contained in a set of resources may be, but need not be, contiguous in the time domain or the frequency domain. In LTE, for example, a Physical Resource Block (PRB) is defined as a grid of M contiguous sub-frequencies and N contiguous OFDM symbols, e.g., where M=12 and N=7.

As used herein, the "size" of a resource or set of resources refers generally to the information capacity of the resource or set of resources, and may refer more specifically to a metric in the time domain, such as duration(s), and/or a metric in the frequency domain, such as bandwidth(s). For example, a first set of resources that occupy one PRB will be "smaller" that a second set of resources that occupy two PRBs. Likewise, a first set of resources that occupy 12 contiguous subcarriers and 2 contiguous timeslots (12×2=24 resource elements) will be "larger" than a second set of resources that occupy 5 contiguous subcarriers and 4 contiguous timeslots (5×4=20 resource elements), because 24 is larger than 20. As another example, a first set of resources that occupy 50 individual resource elements scattered throughout a time-frequency grid will be "smaller" than a second set of resources that occupy 80 individual resource elements scattered throughout the time-frequency grid. In yet another example, a first set of 10 resource elements may be considered to be "larger" than a second set, also having 10 resource elements, if data within the first set may be encoded to convey more information per unit of time and/or frequency as compared to the second set.

Depending on the HARQ feedback size to be reported the terminal selects the configured resource that can support the required number of HARQ feedback bits and periodic CQI bits. Alternatively, the sum of number of HARQ feedback bits and CQI bits determines the selection. For excessively large HARQ feedback bit sizes and/or HARQ plus CQI bits which are not supported by any of the configured resources, dropping can still be an option.

Thus, instead of configuring a terminal with a single periodic CQI resource that is tailored to the CQI payload, in one embodiment a terminal is configured with multiple, differently sized CQI resources. One of the configured resources is matched to the payload size (e.g., the number of bits) expected for periodic CQI only, and another sized resource is tailored to the combined payload size of periodic CQI and expected HARQ feedback size. If a terminal determines it has only to transmit periodic CQI feedback, it selects the corresponding resource. If a terminal determines it has to transmit periodic CQI together with HARQ feedback bits, it selects the corresponding larger resource that matches the increased payload size of periodic CQI and HARQ feedback bits.

In the simplest case of the invention, a terminal has two types of resources configured: those one for "periodic CQI only" and the larger ones for "simultaneous periodic CQI and HARQ feedback."

An optional extension to the invention is a terminal which has multiple resources configured for simultaneous periodic CQI and HARQ feedback. The additional resource(s) have different sizes than the first resource configured for simultaneous feedback of periodic CQI and HARQ feedback. By that, a better matching between periodic CQI and HARQ feedback payload size and required transmission resource can be achieved. Typically, the periodic CQI feedback size does not change, but, depending on scheduling, the number of HARQ feedback bits can change. The selection of which of the resources for simultaneous feedback of periodic CQI and HARQ bits can thus be based on the HARQ feedback payload size or on the combined periodic CQI and HARQ feedback size.

The resources are expected to be semi-statically (e.g., via Radio Resource Control (RRC) signaling) configured on a per-UE basis. This enables also that the same resources can (at least partly) be shared among terminals since each terminal only needs one resource per reporting and not multiple. Therefore, it is advantageous if a resource can be reused and configured for multiple terminals. If a same resource is configured for multiple terminals, it is the responsibility of the scheduler to avoid collisions between them.

Alternatively, however, a terminal may be configured or provisioned statically (e.g., the terminal configuration may be hard-coded or configured just once) or dynamically (e.g., the terminal may receive configuration information via a wired or wireless connection). These examples are intended to be illustrative and not limiting.

To simplify the task of collision avoidance, it can be envisioned that a scheduler can indicate to a UE which resource of the multiple configured resources to use for the current transmission of periodic CQI or simultaneous transmission of periodic CQI and HARQ feedback. Technically it is no problem to use a larger than needed resource for a given payload. This indication 17 can, e.g., be conveyed via a DCI or MAC control signaling (MAC control element) from the scheduling node to the terminal. The selection of resources can thus be based on 1) a payload size (as before), 2) a received indication, or 3) a combination of 1 and 2.

Typically the configured resources for a terminal have different sizes (to match differently sized payloads). However, one could envision that at least a few resources have the same size. This could be useful if resources are (at least partly) selected on input received from the scheduling node.

The scheduling node would then have multiple equal resources at its disposal to avoid collisions if resources are reused among terminals.

Figure 2A:
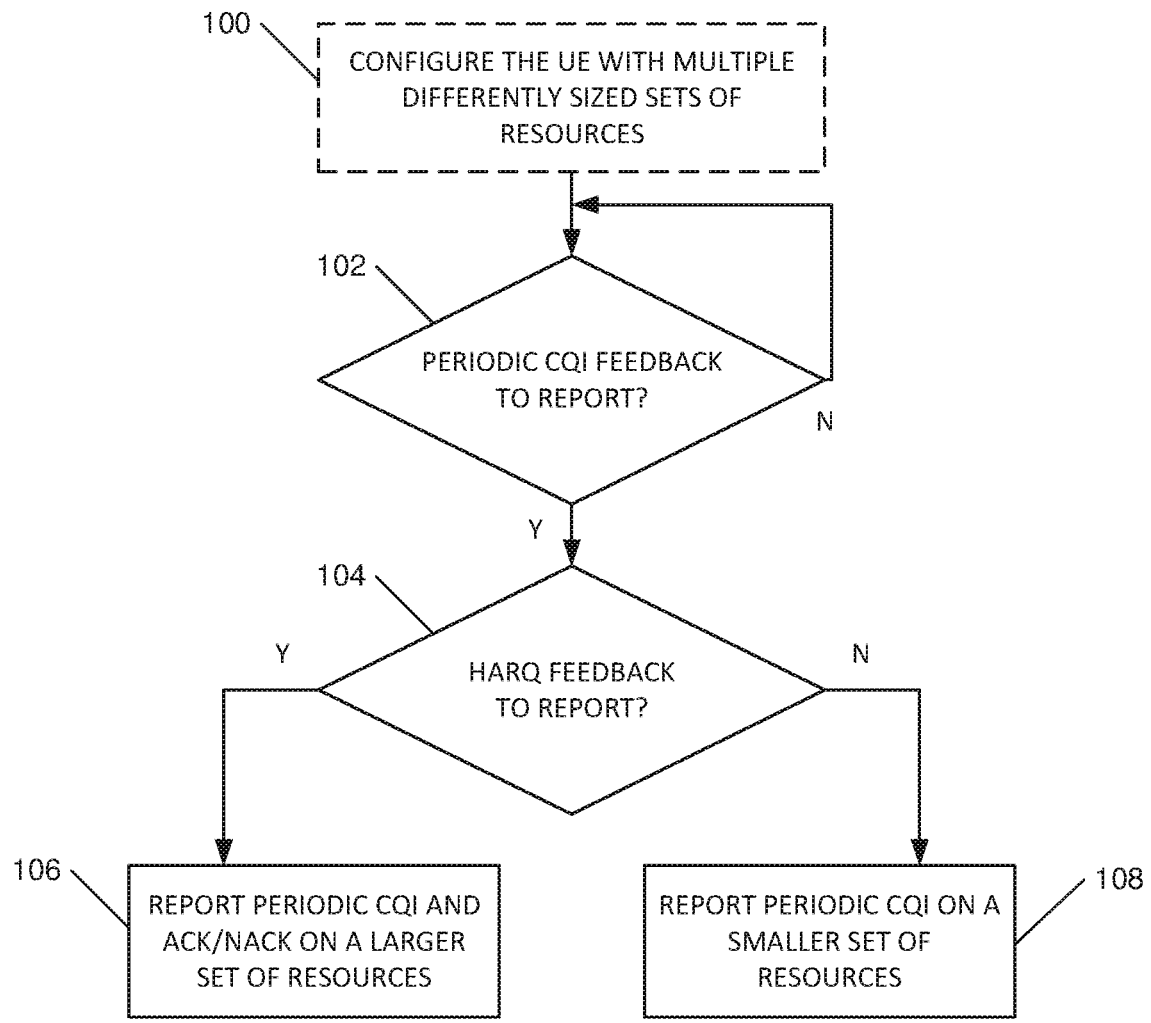
FIG. 2A illustrates a procedure for simultaneous transmission of periodic Channel Quality Indicator (CQI) and Acknowledgment (ACK)/Negative Acknowledgement (NACK) according to some embodiments of the present disclosure.

FIG. 2A illustrates a procedure for simultaneous transmission of periodic CQI and HARQ ACK/NACK according to some embodiments of the present disclosure. In the embodiment illustrated in FIG. 2A, at step 100, the UE is configured with multiple differently sized sets of resources. This step can have been executed at an earlier time, and need happen only once (but could happen more often if desired). In the simplest case, for example, a UE may have only two sets of resources configured, one (smaller) for periodic CQI and one (larger) for simultaneous transmission of periodic CQI and HARQ feedback bits. For brevity, the sets of resources may also be referred to simply as "resources," e.g., "the smaller set of resources" may be referred to as "the smaller resource," and so on.

When a UE needs to report periodic CQI alone or together with HARQ feedback, it selects one of the configured resources accordingly. At step 102, the UE determines whether a periodic CQI feedback should be reported. If not, the process waits at step 102 until a periodic CQI feedback is ready to be reported, at which time the process goes to step 104. At step 104, the UE determines whether there is also HARQ feedback (e.g., an ACK or NACK) to be reported. If so, the process moves to step 106, where the periodic CQI and ACK/NACK are reported using a larger set of resources (or the larger of the two sets of configured resources, if only two sets are configured). If not, the process moves to step 108, where the periodic CQI and ACK/NACK are reported using a smaller set of resources (or the smaller of the two sets of resources, if only two sets are configured).

Figure 2B:
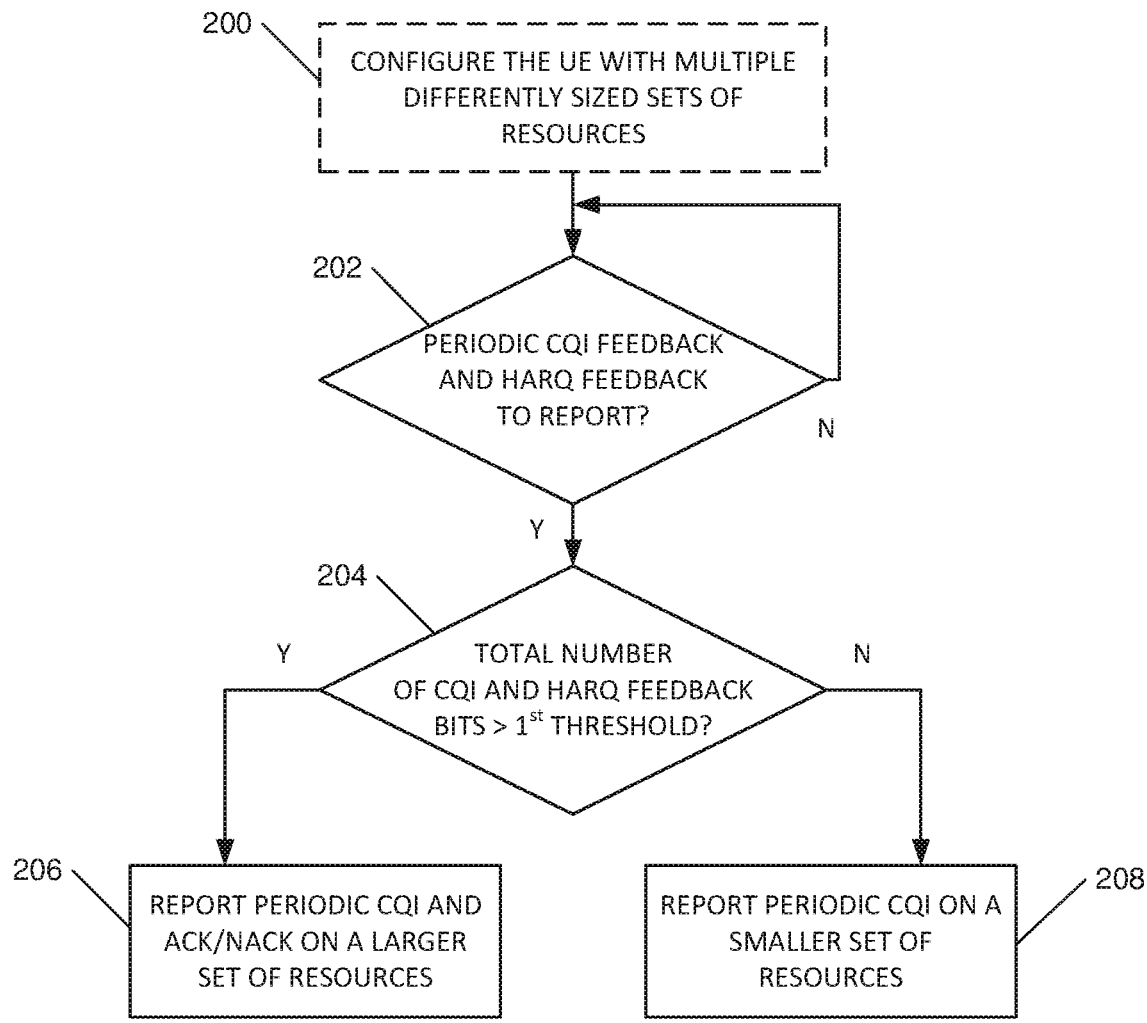
FIG. 2B illustrates a procedure for simultaneous transmission of periodic CQI and ACK/NACK according to other embodiments of the present disclosure.

FIG. 2B illustrates a procedure for simultaneous transmission of periodic CQI and HARQ ACK/NACK according to other embodiments of the present disclosure. In the embodiment illustrated in FIG. 2B, at step 200, the UE is configured with multiple differently sized sets of resources. This step can have been executed at an earlier time, and need happen only once (but could happen more often if desired). In the simplest case, for example, a UE may have only two sets of resources configured, one (smaller) for periodic CQI and one (larger) for simultaneous transmission of periodic CQI and HARQ feedback bits.

When a UE needs to report periodic CQI feedback together with HARQ feedback its selects one of the configured resources accordingly based on the size of the feedback payload (i.e., the number of bits of the periodic CQI feedback and the HARQ feedback together). At step 202, the UE determines whether a periodic CQI feedback and HARQ feedback should both be reported. If not, the process waits at step 202 until that condition is met, at which time the process goes to step 204. At step 204, the UE determines whether the combined total number of bits of the CQI and HARQ feedback is greater than a first threshold. If so, the process moves to step 206, where the periodic CQI feedback and HARQ feedback are reported using a larger set of resources (or the larger of the two sets of configured resources, if only two sets are configured). If not, the process moves to step 208, where the periodic CQI feedback and the HARQ feedback are reported using a smaller set of resources (or the smaller of the two sets of resources, if only two sets are configured).

Figure 2C:
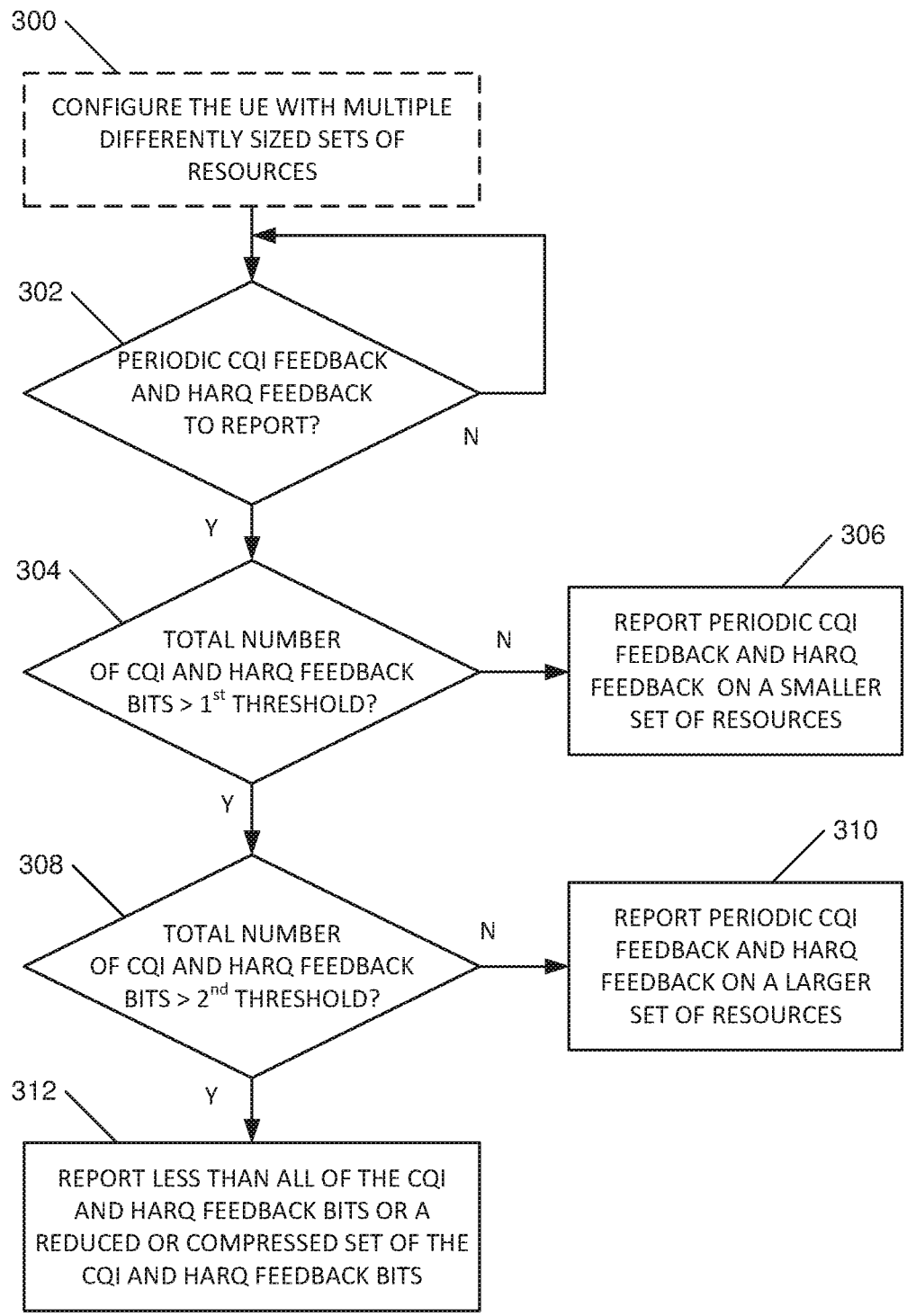
FIG. 2C illustrates a procedure for simultaneous transmission of periodic CQI and ACK/NACK according to yet other embodiments of the present disclosure.

FIG. 2C illustrates a procedure for simultaneous transmission of periodic CQI and HARQ ACK/NACK according to other embodiments of the present disclosure. In the embodiment illustrated in FIG. 2C, at step 300, the UE is configured with multiple differently sized sets of resources.

This step can have been executed at an earlier time, and need happen only once (but could happen more often if desired). In the simplest case, for example, a UE may have only two sets of resources configured, one (smaller) for periodic CQI and one (larger) for simultaneous transmission of periodic CQI and HARQ feedback bits.

When a UE needs to report periodic CQI feedback together with HARQ feedback its selects one of the configured resources accordingly based on the size of the feedback payload (i.e., the number of bits of the periodic CQI feedback and the HARQ feedback together). At step 302, the UE determines whether a periodic CQI feedback and HARQ feedback should both be reported. If not, the process waits at step 302 until that condition is met, at which time the process goes to step 304.

At step 304, the UE determines whether the combined total number of bits of the CQI and HARQ feedback is greater than a first threshold. If not, the process moves to step 306, where the periodic CQI feedback and HARQ feedback are reported using a smaller set of resources. Otherwise, the process moves to step 308.

At step 308, the UE determines whether the combined total number of bits of the CQI and HARQ feedback is greater than a second threshold that is larger than the first threshold. If not, the process moves to step 310, where the periodic CQI feedback and HARQ feedback are reported using a larger set of resources. Otherwise, the process moves to step 312.

At step 312, the UE reports a subset of the CQI and HARQ feedback bits. This may be because the size of the CQI and HARQ feedback payload is larger than the largest available set of resources, for example. In an alternative embodiment, the CQI and HARQ feedback payload may be compressed or otherwise reduced so that it fits an available set of resources.

As described earlier, it is possible to configure a terminal with more than two differently sized resources to enable a better matching between required resource size and reporting payload. If reporting multiple quantities, it can also be envisioned to report reduced quantities together, e.g., bundle HARQ feedback bits and/or CQI with reduced size.

In the text above, the quantities of ACK/NACK and CQI have been considered. However, the invention is easily generalized to different and/or more types of feedback signaling, for example ACK, CQI, and Scheduling Request (SR).

The subject matter presented herein has the advantage that periodic CQI bits are less often (or perhaps never) dropped, which avoids the problem of the transmitter having only outdated CQI information. This improves link adaptation and increases throughput.

Figure 3:
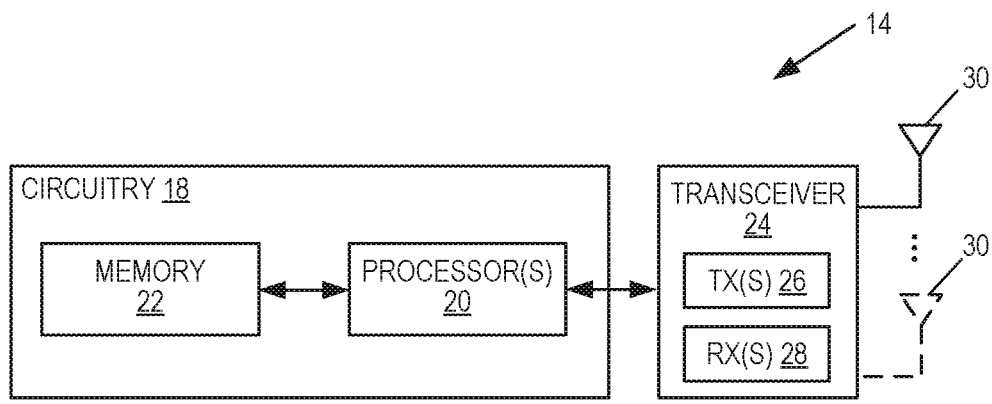
FIGS. 3-7 illustrate example embodiments of radio network nodes according to some embodiments of the present disclosure.
Figure 4:
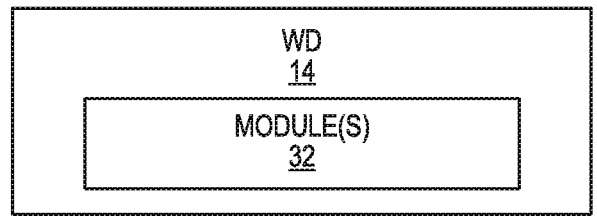

FIGS. 3 and 4 illustrate example embodiments of a wireless device 14 according to some embodiments of the present disclosure.

FIG. 3 is a schematic block diagram of the wireless device 14 (e.g., a UE 14) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24, each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 4 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., UE 14) described herein.

Figure 5:
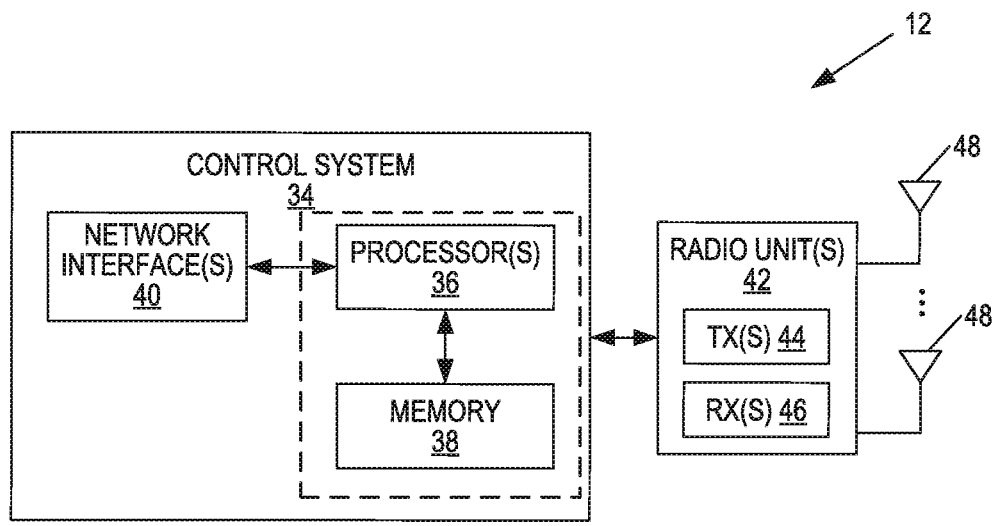
Figure 6:
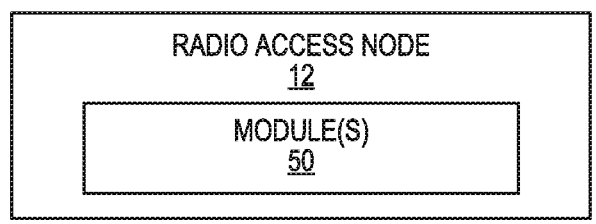
Figure 7:
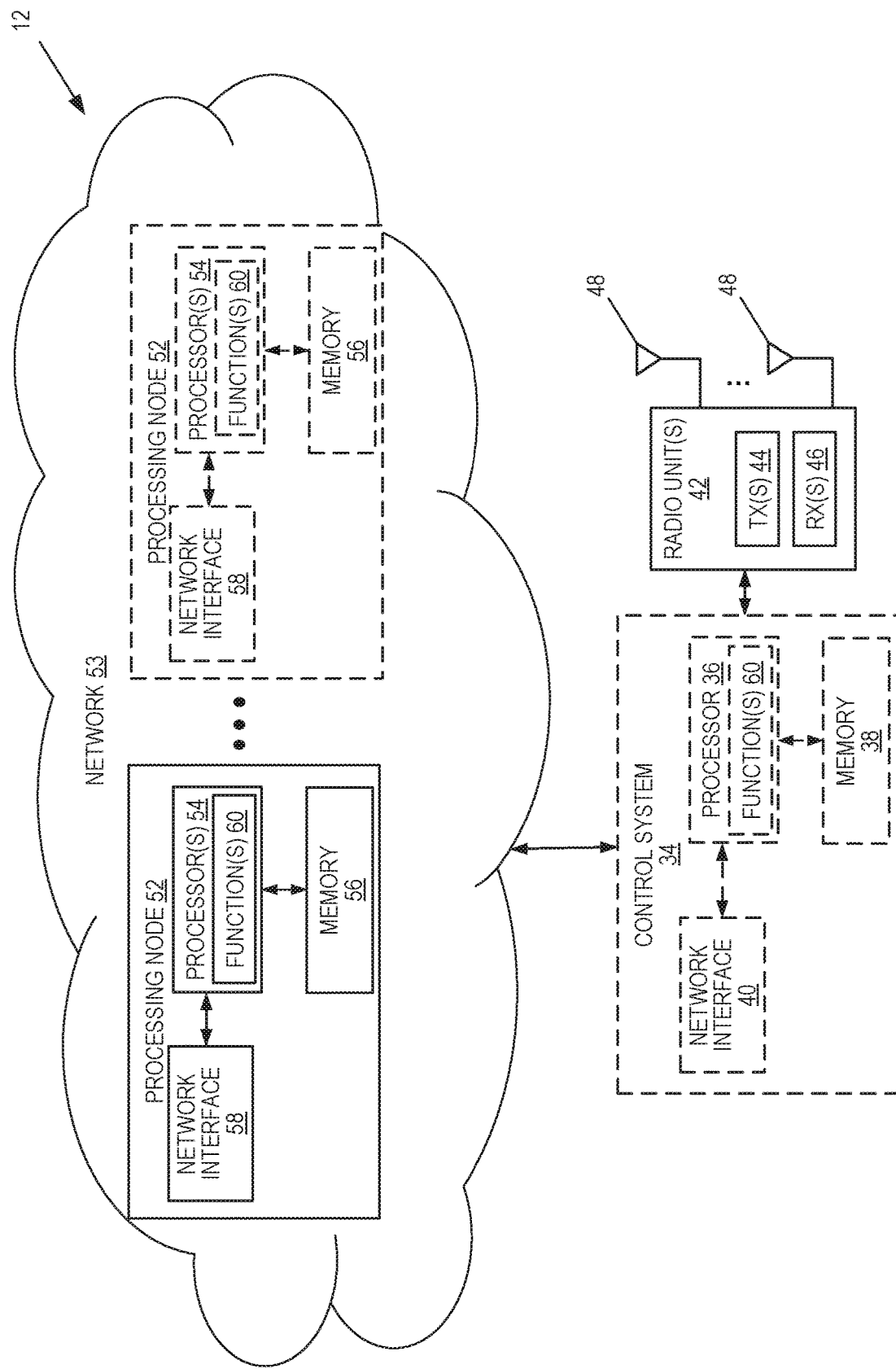

FIGS. 5 through 7 illustrate example embodiments of a radio network node according to some embodiments of the present disclosure.

FIG. 5 is a schematic block diagram of the node 12 according to some embodiments of the present disclosure. Other types of network nodes may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes a network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

FIG. 6 is a schematic block diagram of the node 12 according to some other embodiments of the present disclosure. The node 12 includes one or more modules 50, each of which is implemented in software. The module(s) 50 provide the functionality of the node 12 (e.g., radio access node 12) described herein.

FIG. 7 is a schematic block diagram that illustrates a virtualized embodiment of the radio access node 12 according to some embodiments of the present disclosure. Other types of network nodes may have similar architectures (particularly with respect to including processor(s), memory, and a network interface). As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 5. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 52 coupled to or included as part of a network(s) 53 via the network interface 40. Alternatively, if the control system 34 is not present, the one or more radio units 42 are connected to the one or more processing nodes 52 via a network interface(s). Each processing node 52 includes one or more processors 54 (e.g., CPUs, ASICs, FPGAs, and/or the like), memory 56, and a network interface 58.

In this example, functions 60 of the radio access node 12 described herein are implemented at the one or more processing nodes 52 or distributed across the control system 34 (if present) and the one or more processing nodes 52 in any desired manner. In some particular embodiments, some or all of the functions 60 of the radio access node 12 described herein are implemented as virtual components executed by one or more virtual machines implemented in a virtual environment(s) hosted by the processing node(s) 52. As will be appreciated by one of ordinary skill in the art, additional signaling or communication between the processing node(s) 52 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 52 via an appropriate network interface(s).

In some embodiments, a computer program including instructions which, when executed by at least one processor, causes the at least one processor to carry out the functionality of the radio access node 12 or a processing node 52 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

EXAMPLE EMBODIMENTS

While not being limited thereto, some example embodiments of the present disclosure are provided below.

1. A method of operation of a node, the method comprising: configuring the node to have two differently sized sets of resources; determining that the node needs to report a periodic CQI feedback; determining whether the node needs to also report a HARQ feedback; upon a determination that the node needs to also report a HARQ feedback, reporting the periodic CQI feedback and the HARQ feedback on the larger set of the two differently sized sets of resources; and, upon a determination that the node does not need to also report a HARQ feedback, reporting the periodic CQI feedback on the smaller set of the two differently sized sets of resources.

2. The method of embodiment 1, further comprising, upon a determination that the node needs to also report a HARQ feedback: determining whether the total number of CQI and HARQ feedback bits exceeds a first threshold; and, upon a determination that the total number of CQI and HARQ feedback bits exceeds the first threshold, reporting less than all of the CQI and HARQ feedback bits or a reduced or compressed set of the CQI and HARQ feedback bits.

3. The method of embodiment 1 or 2 wherein the HARQ feedback comprises an ACK or NACK.

4. The method of any of embodiments 1 to 3 wherein the node is configured to have more than two differently sized sets of resources and wherein one of the more than two sets of resources is selected according to the number of bits that comprise the HARQ feedback.

5. The method of any of embodiments 1 to 4 wherein the node is configured to have more than two differently sized sets of resources and wherein one of the more than two sets of resources is selected according to the number of bits that comprise the CQI feedback and the HARQ feedback.

6. The method of any of embodiments 1 to 4 wherein a scheduler indicates to the node which one of the sets of resources to use for reporting the CQI and/or HARQ feedback.

7. The method of embodiment 6 wherein the indication is conveyed to the node via DCI or MAC control signaling.

8. The method of any of embodiments 1 to 7 wherein the selection of the set of resources is based on a payload size and/or a received indication.

9. A method of operation of a node, the method comprising: configuring the node to have two differently sized sets of resources; determining that the node needs to report a periodic CQI feedback and a HARQ feedback; determining whether the total number of CQI feedback bits and HARQ feedback bits exceeds a first threshold; upon a determination that the total number of CQI and HARQ feedback bits exceeds the first threshold, reporting the periodic CQI feedback and HARQ feedback on the larger set of the two differently sized sets of resources; and, upon a determination that the total number of CQI and HARQ feedback bits does not exceed the first threshold, reporting the periodic CQI feedback and HARQ feedback on the smaller set of the two differently sized sets of resources.

10. The method of embodiment 9 further comprising: determining whether the total number of CQI and HARQ feedback bits exceeds a second threshold greater than the first threshold; upon a determination that the total number of CQI and HARQ feedback bits exceeds the second threshold, reporting less than all of the CQI and HARQ feedback bits or a reduced or compressed set of the CQI and HARQ feedback bits using one of the sets of resources.

11. The method of embodiment 9 or 10 wherein the node is configured to have more than two differently sized sets of resources and wherein one of the more than two sets of resources is selected according to the number of bits that comprise the HARQ feedback.

12. The method of any of embodiments 9 to 11 wherein a scheduler indicates to the node which one of the sets of resources to use for reporting the CQI and/or HARQ feedback.

13. The method of embodiment 12 wherein the indication is conveyed to the node via DCI or MAC control signaling.

14. The method of any of embodiments 9 to 13 wherein the selection of the set of resources is based on a payload size and/or a received indication.

15. A node adapted to operate according to the method of any of embodiments 1 to 14.

16. A node, comprising: at least one processor; and memory comprising instructions executable by the at least one processor, whereby the node is operable to: configure the node to have two differently sized sets of resources; determine that the node needs to report a periodic CQI feedback; determine whether the node needs to also report a HARQ feedback; upon a determination that the node needs to also report a HARQ feedback, report the periodic CQI feedback and HARQ feedback on the larger set of the two differently sized sets of resources; and, upon a determination that the node does not need to also report a HARQ feedback, report the periodic CQI feedback on the smaller set of the two differently sized sets of resources.

17. The node of embodiment 16 wherein the node is operable to, upon a determination that the node needs to also report a HARQ feedback: determine whether the total number of CQI and HARQ feedback bits exceeds a first threshold; and, upon a determination that the total number of CQI and HARQ feedback bits exceeds the first threshold, report less than all of the CQI and HARQ feedback bits or a reduced or compressed set of the CQI and HARQ feedback bits.

18. The node of embodiment 16 or 17 wherein the HARQ feedback comprises an ACK or NACK.

19. The node of any of embodiments 16 to 18 wherein the node is configured to have more than two differently sized sets of resources and wherein one of the more than two sets of resources is selected according to the number of bits that comprise the HARQ feedback.

20. The node of any of embodiments 16 to 19 wherein the node is configured to have more than two differently sized sets of resources and wherein one of the more than two sets of resources is selected according to the number of bits that comprise the CQI feedback and the HARQ feedback.

21. The node of any of embodiments 16 to 20 wherein a scheduler indicates to the node which one of the sets of resources to use for reporting the CQI and/or HARQ feedback.

22. The node of embodiment 21 wherein the indication is conveyed to the node via DCI or MAC control signaling.

23. The node of any of embodiments 16 to 22 wherein the selection of the set of resources is based on a payload size and/or a received indication.

24. A node, comprising: at least one processor; and memory comprising instructions executable by the at least one processor, whereby the node is operable to: configure the node to have two differently sized sets of resources; determine that the node needs to report a periodic CQI feedback and a HARQ feedback; determine whether the total number of CQI feedback bits and HARQ feedback bits exceeds a first threshold; upon a determination that the total number of CQI and HARQ feedback bits exceeds the first threshold, report the periodic CQI feedback and HARQ feedback on the larger set of the two differently sized sets of resources; and, upon a determination that the total number of CQI and HARQ feedback bits does not exceed the first threshold, report the periodic CQI feedback and HARQ feedback on the smaller set of the two differently sized sets of resources.

25. The node of embodiment 24, wherein the node is further operable to: determine whether the total number of CQI and HARQ feedback bits exceeds a second threshold greater than the first threshold; and, upon a determination that the total number of CQI and HARQ feedback bits exceeds the second threshold, report less than all of the CQI and HARQ feedback bits or a reduced or compressed set of the CQI and HARQ feedback bits using one of the sets of resources.

26. The node of embodiment 24 or 25 wherein the node is configured to have more than two differently sized sets of resources and wherein one of the more than two sets of resources is selected according to the number of bits that comprise the HARQ feedback.

27. The node of any of embodiments 24 to 26 wherein a scheduler indicates to the node which one of the sets of resources to use for reporting the CQI and/or HARQ feedback.

28. The node of embodiment 27 wherein the indication is conveyed to the node via DCI or MAC control signaling.

20. The node of any of embodiments 24 to 28 wherein the selection of the set of resources is based on a payload size and/or a received indication.

The following acronyms may be used within this disclosure.

ACK Acknowledge (e.g., successful transmission)
ASIC Application Specific Integrated Circuit
CA Carrier Aggregation
CPU Central Processing Unit
CQI Channel Quality Indicator
CSI Channel State Information
DCI Downlink Control Information
eNB Enhanced or Evolved Node B
FDD Frequency Division Duplexing
FPGA Field Programmable Gate Array
HARQ Hybrid Automatic Repeat Request
LTE Long Term Evolution
MAC Medium Access Control
MIMO Multiple Input Multiple Output
NACK Negative Acknowledge (e.g., failed transmission)
PUCCH Physical Uplink Control Channel
PUSCH Physical Uplink Shared Channel
RRC Radio Resource Control
SR Scheduling Request
TDD Time Division Duplexing
TRP Transmission and Reception Point
UE User Equipment Those skilled in the art will recognize improvements and modifications to the embodiments of the present disclosure. All such improvements and modifications are considered within the scope of the concepts disclosed herein.

What is claimed is:

1. A method of operation of a node configured to have two differently sized sets of resources, the method comprising:
    determining that the node needs to report feedback, the feedback comprising at least a periodic Channel Quality Indicator (CQI) feedback;
    upon determining that the node needs to report the feedback, selecting a set of the two differently sized sets of resources to be used for reporting the feedback, wherein a larger set of the two differently sized sets of resources is selected when the feedback also comprises a Hybrid Automatic Repeat Request (HARQ) feedback, and wherein a smaller set of the two differently sized sets of resources is selected when the feedback does not also comprise the HARQ feedback; and
    reporting the feedback on the selected set.

2. The method of claim 1 wherein the node is configured to have more than two differently sized sets of resources.

3. The method of claim 2 wherein one of the more than two differently sized sets of resources is selected according to a number of bits that comprise the feedback.

4. The method of claim 2 wherein one of the more than two differently sized sets of resources is selected according to a number of bits that comprise the HARQ feedback.

5. The method of claim 1 wherein the node receives an indication of which one of the more than two differently sized sets of resources to use for reporting the feedback.

6. The method of claim 5 wherein the node receives the indication via Downlink Control Information (DCI) or Media Access Control (MAC) control signaling.

7. The method of claim 5 wherein the selection is based at least in part on the received indication.

8. The method of any of claim 1 wherein the selection is based at least in part on the number of bits that comprise the feedback.

9. A node, configurable to have two differently sized sets of resources, the node comprising:
    at least one processor;
    memory comprising instructions executable by the at least one processor whereby the node is operable to:
        determine that the node needs to report feedback, the feedback comprising at least a periodic Channel Quality Indicator (CQI) feedback;

upon determining that the node needs to report the feedback, select a set of the two differently sized sets of resources to be used for reporting the feedback, wherein a larger set of the two differently sized sets of resources is selected when the node needs to also report a Hybrid Automatic Repeat Request (HARQ) feedback, and wherein a smaller set of the two differently sized sets of resources is selected when the node does not need to also report the HARQ feedback; and report the feedback on the selected set.

10. The node of claim 9 wherein the node is configured to have more than two differently sized sets of resources.

11. The node of claim 10 wherein one of the more than two differently sized sets of resources is selected according to a number of bits that comprise the feedback.

12. The node of claim 10 wherein one of the more than two differently sized sets of resources is selected according to a number of bits that comprise the HARQ feedback.

13. The node of claim 9 wherein the node receives an indication of which one of the more than two differently sized sets of resources to use for reporting the feedback.

14. The node of claim 13 wherein the selection is based at least in part on the received indication.

15. The node of claim 9 wherein the selection is based at least in part on the number of bits that comprise the feedback.

* * * * *